United States Patent
Khoury et al.

(10) Patent No.: US 8,265,584 B2
(45) Date of Patent: Sep. 11, 2012

(54) PROVIDING IMAGE REJECTION CALIBRATION FOR A RECEIVER

(75) Inventors: John Khoury, Austin, TX (US); Mitch Reid, Austin, TX (US); Majid Barazande-Pour, Bridgewater, NJ (US)

(73) Assignee: Silicon Laboratories Inc., Austin, TX (US)

( * ) Notice: Subject to any disclaimer, the term of this patent is extended or adjusted under 35 U.S.C. 154(b) by 546 days.

(21) Appl. No.: 12/493,738

(22) Filed: Jun. 29, 2009

(65) Prior Publication Data

US 2010/0330947 A1 Dec. 30, 2010

(51) Int. Cl.
*H04B 1/10* (2006.01)

(52) U.S. Cl. .................... 455/296; 455/278.1; 455/63.1; 375/346; 375/350

(58) Field of Classification Search .................. 455/424, 455/425, 456.5, 456.6, 561, 550.1, 575.1, 455/75, 131, 135, 67.11, 130, 302, 226.1, 455/285, 296, 226.2, 63.1; 375/220, 332, 375/335, 346, 260, 229, 147, 350, 316, 355, 375/231, 142, 143, 150, 152, 343, 323; 370/500, 370/503, 509, 516, 525
See application file for complete search history.

(56) References Cited

U.S. PATENT DOCUMENTS

| | | | |
|---|---|---|---|
| 4,345,241 A | | 8/1982 | Takeuchi et al. |
| 5,740,208 A * | | 4/1998 | Hulbert et al. ............... 375/346 |
| 6,456,316 B1 * | | 9/2002 | Jun ................................. 348/21 |
| 6,606,010 B1 * | | 8/2003 | Poklemba et al. ............. 332/103 |
| 6,744,829 B1 | | 6/2004 | Mohindra |
| 6,792,054 B1 * | | 9/2004 | Bitran et al. .................... 375/343 |
| 6,892,060 B2 * | | 5/2005 | Zheng ............................ 455/302 |
| 6,959,016 B1 | | 10/2005 | Keeth et al. |
| 7,158,586 B2 | | 1/2007 | Husted |
| 7,477,881 B2 * | | 1/2009 | Kim ............................... 455/130 |
| 7,522,899 B1 * | | 4/2009 | He ................................. 455/302 |
| 7,580,680 B2 * | | 8/2009 | Isaac et al. .................. 455/67.11 |
| 7,636,558 B2 * | | 12/2009 | Olson ......................... 455/226.1 |
| 7,684,778 B1 * | | 3/2010 | Qian et al. ..................... 455/302 |
| 7,873,342 B2 * | | 1/2011 | Lim et al. ...................... 455/285 |
| 7,903,771 B2 * | | 3/2011 | Cho et al. ...................... 375/346 |
| 2004/0002323 A1 * | | 1/2004 | Zheng ............................ 455/324 |
| 2005/0070236 A1 * | | 3/2005 | Paulus ........................... 455/135 |
| 2005/0089120 A1 * | | 4/2005 | Quinlan et al. ................ 375/335 |

(Continued)

OTHER PUBLICATIONS

Valkama et al. [ IEEE 1053-587x01, Oct. 2001, Title: Advanced methods for I/Q Imbalance compensation in communication receivers, IEEE transactions on signal processing, vol. 49, No. 10.*

(Continued)

*Primary Examiner* — Duc Nguyen
*Assistant Examiner* — Charles Chow
(74) *Attorney, Agent, or Firm* — Trop, Pruner & Hu, P.C.

(57) ABSTRACT

According to one embodiment, a method for updating filter values of an image canceller is provided. The method may include determining a channel-to-image (C/I) ratio between a channel signal and an image signal at the canceller input and generating a gain control value based at least in part on the C/I ratio. Then correlations between the channel signal and the image signal at the canceller's input and output can be generated, along with a gear control value based at least in part on a ratio between the correlations. In turn, one or more filters of the canceller can be updated using the control values.

27 Claims, 8 Drawing Sheets

U.S. PATENT DOCUMENTS

| | | | |
|---|---|---|---|
| 2005/0135521 | A1 | 6/2005 | Nemer et al. |
| 2005/0148304 | A1* | 7/2005 | Jerng .......................... 455/75 |
| 2005/0243949 | A1 | 11/2005 | Khoini-Poorfard |
| 2006/0003722 | A1* | 1/2006 | Tuttle et al. ................. 455/285 |
| 2007/0080835 | A1* | 4/2007 | Maeda et al. ................ 341/120 |
| 2007/0097271 | A1* | 5/2007 | Gao et al. .................... 348/724 |
| 2007/0237264 | A1* | 10/2007 | Huang et al. ................ 375/332 |
| 2008/0089397 | A1* | 4/2008 | Vetter et al. ................. 375/220 |
| 2008/0096513 | A1* | 4/2008 | Lim et al. .................... 455/302 |
| 2009/0058705 | A1* | 3/2009 | Cetin et al. .................. 341/155 |
| 2010/0159858 | A1* | 6/2010 | Dent et al. ................... 455/131 |
| 2010/0167680 | A1* | 7/2010 | Li et al. ....................... 455/302 |
| 2010/0246995 | A1* | 9/2010 | Paulus et al. ................ 382/275 |

OTHER PUBLICATIONS

Van Gerven et al. [ IEEE 1053-587x-95, , Jul. 1995, Title: signal separation by symmetric adaptive decorrelation: stability, convergence, and uniqueness, IEEE transactions on signal processing, vol. 43, No. 7 ].*

Keng Leong Fong, et al., "High-Frequency Nonlinearity Analysis of Common-Emitter and Differential-Pair Transconductance Stages," IEEE Journal of Solid State Circuits, vol. 33, No. 4, pp. 548-555. Apr. 1998.

Keng Leong Fong, et al., "A Class AB Monolithic Mixer for 900 MHz Applications," IEEE Journal of Solid-State Circuits, pp. 1166-1172, Aug. 1997.

Keng Leong Fong, et al., "2.4 Monolithic Mixer for Wireless LAN Applications," IEEE Custom Integrated Circuits Conference, pp. 9.4.1-9.4.4, May 1997.

Stefaan Van Gerven, et al., "Signal Separation by Symmetric Adaptive Decorrelation: Stability, Convergence, and Uniqueness," IEEE Transactions on Signal Processing, vol. 43, No. 7, Jul. 1995, pp. 1602-1612.

Fred Harris, "Digital Filter Equalization of Analog Gain and Phase Mismatch in I-Q Receivers,"1996, pp. 793-796.

Stefaan Van Gerven, et al., "On the Use of Decorrelation in Scalar Signal Separation," IEEE, 1994, pp. 57-60.

Mikko Valkama, et al., "Advanced Methods for I/Q Imbalance Compensation in Communication Receivers," IEEE Transactions on Signal Processing, vol. 49, No. 10, Oct. 2001, pp. 2335-2344.

Supisa Lerstaveesin, et al., "A Complex Image Rejection Circuit With Sign Detection Only," IEEE Journal of Solid-State Circuits, vol. 41, No. 12, Dec. 2006, pp. 2693-2702.

U.S. Appl. No. 12/317,786, filed Dec. 30, 2008, entitled "Controllable Image Cancellation in a Radio Receiver," by Junsong Li.

* cited by examiner

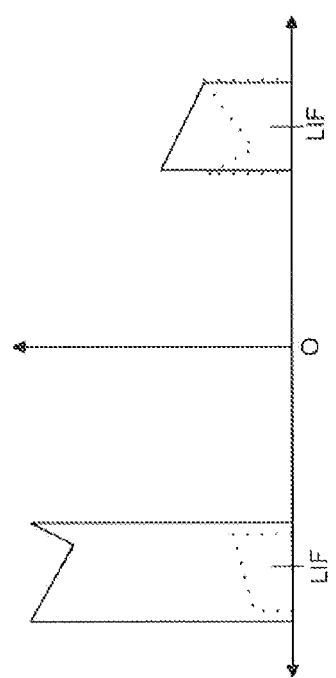
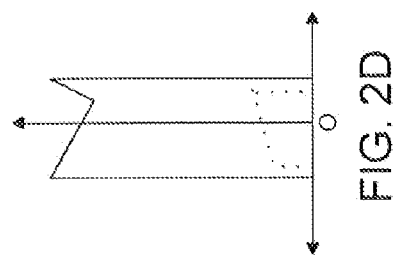
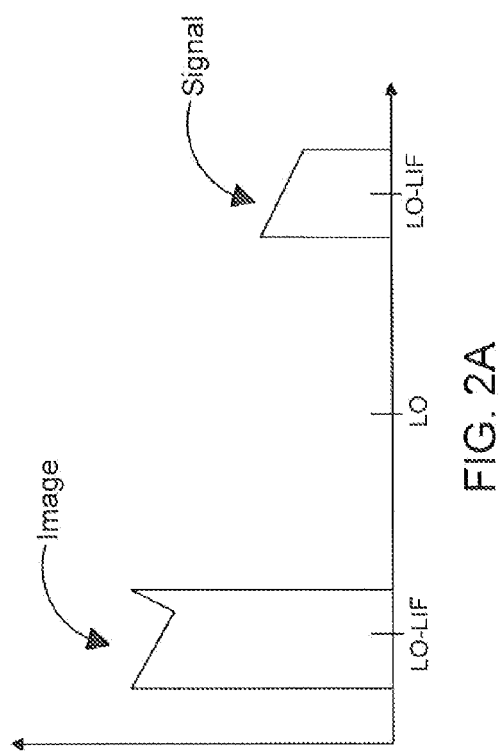

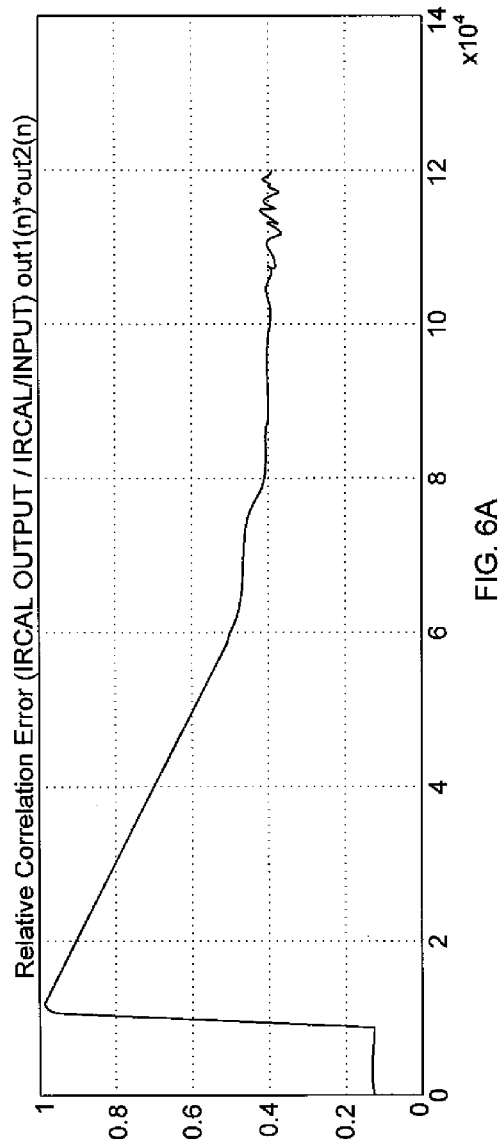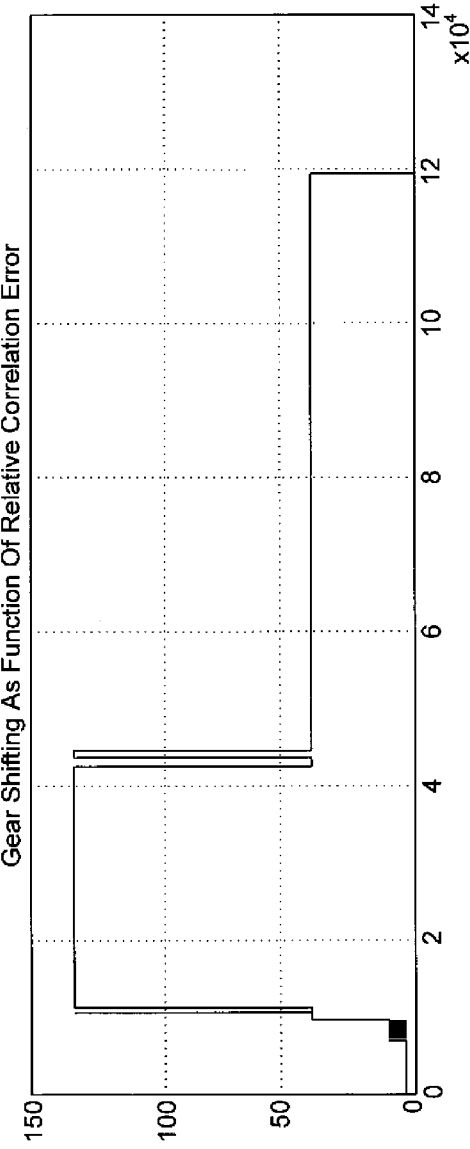
FIG. 6A
FIG. 6B

US 8,265,584 B2

PROVIDING IMAGE REJECTION CALIBRATION FOR A RECEIVER

BACKGROUND

Many receivers, both radio and television, include an in-phase/quadrature (I/Q) demodulation architecture, in which a received modulated carrier signal is simultaneously applied to an I-channel mixer and a Q-channel mixer. A local oscillator (LO) is also applied to the mixers to effect frequency conversion from a radio frequency (RF) at which the radio signal is received to an intermediate frequency (IF). In an I/Q demodulator, the LO signal that is applied to this Q-channel mixer is offset by 90° from the LO signal that is applied to the I-channel mixer.

Image rejection is one metric by which receiver system performance may be evaluated. In general, image rejection refers to the ability of the receiver to reject responses resulting from RF signals at a frequency offset from the desired RF carrier frequency by an amount equal to twice the IF of a dual-conversion receiver. For example, if the desired RF signal is at 100 megahertz (MHz), and the receiver IF is 4 MHz, then the receiver LO will be tuned to 96 MHz. However, as is well known to those skilled in the art, the receiver will also exhibit a response to undesired RF signals (i.e., image signals) at a frequency 4 MHz below the LO frequency, in this case, 92 MHz. The receiver's response to the 92 MHz signal is referred to as the image response, because the image signal resides at a frequency opposite the LO frequency from the desired RF carrier, and offset from the LO frequency by the magnitude of the IF. A similar image signal appears to the high side, where the LO is greater than the desired RF carrier and the image frequency is larger than the LO frequency.

In a typical low IF receiver architecture, mismatch between in-phase and quadrature phase paths cause image interference cross-talk. In many receivers, one or more strong adjacent channels may become the image interference and make reception unacceptable.

SUMMARY OF THE INVENTION

One aspect of the present invention is directed to an apparatus to provide for image rejection. The apparatus includes multiple paths, including a signal channel path with a first mixer to downconvert a signal to a signal channel baseband signal and an image channel path with a second mixer to downconvert the signal to an image channel baseband signal. An image rejection calibration unit can receive the signal and image channel baseband signals, and may include signal and image filters to receive the respective signal and image channel baseband signals and generate filtered signal and image channel values, first and second combiners to combine the respective signal and image channel baseband signals with the respective filtered image and signal channel values to obtain signal and image channel path outputs. In addition, the calibration unit may include a signal correlator to correlate a current sample of the image channel path output with a current sample and at least one previous sample of the signal channel path output.

To enable more efficient updating of the filters, additional circuitry may be present to generate various control signals. This circuitry may include a first circuit to determine correlations of the signal channel baseband signal and the image channel baseband signal and of the signal channel path output and the image channel path output, respectively, and to generate a gear control signal based at least in part on the correlations. In addition, a second circuit may be present to determine a signal strength of the signal and image channel baseband signals and generate a gain control signal based at least in part on the relative signal strengths.

Another aspect of the present invention is directed to a system that includes an antenna to receive a radio frequency (RF) signal and an analog front end to downconvert it to a digital complex signal. The system further includes a digital signal processor (DSP) having an image canceller to perform image rejection. In one implementation, the image canceller includes filters to receive signal and image channel values, respectively, and generate filtered signal and image channel values, combiners to combine the respective channel values and the opposite filtered channel values to obtain signal and image channel outputs. In addition, the canceller can include multiple correlators each to correlate a current sample of the respective channel output with a current sample and at least one previous sample of the opposite channel output. In turn, the filters can be updated based at least in part on the correlator outputs.

Yet another aspect of the present invention is directed to a method for updating filter values of an image canceller. In one implementation, the method may include determining a channel-to-image (C/I) ratio between a channel signal and an image signal at the canceller input and generating a gain control value based at least in part on the C/I ratio. Then correlations between the channel signal and the image signal at the canceller's input and output can be generated, along with a gear control value based at least in part on a ratio between the correlations. In turn, one or more filters of the canceller can be updated using the control values.

BRIEF DESCRIPTION OF THE DRAWINGS

FIGS. 2A-2D are diagrams of the desired signal and interferer at different frequencies in accordance with one embodiment of the present invention.

FIGS. 6A and 6B are timing diagrams of a gear shifting example in accordance with one embodiment of the present invention.

DETAILED DESCRIPTION

Due to mismatches in an analog front end of a receiver having a complex signal path (i.e., in-phase (I) and quadrature-phase (Q) paths), part of an interference (e.g., image) signal may be within a desired signal band (and vice-versa). Embodiments seek to remove the interference from contaminating the opposite path. More specifically, complex adaptive finite impulse response (FIR) filters can remove the residuals from the paths. Furthermore in some embodiments, an adaptive gain and gear shifting algorithm can control convergence based at least in part on analysis of desired channel and interference relative strengths and signal-to-interferer relative correlation at input and output of the calibration block. Different gains and gear shifting can be used at the beginning and end of convergence.

Figure 1:
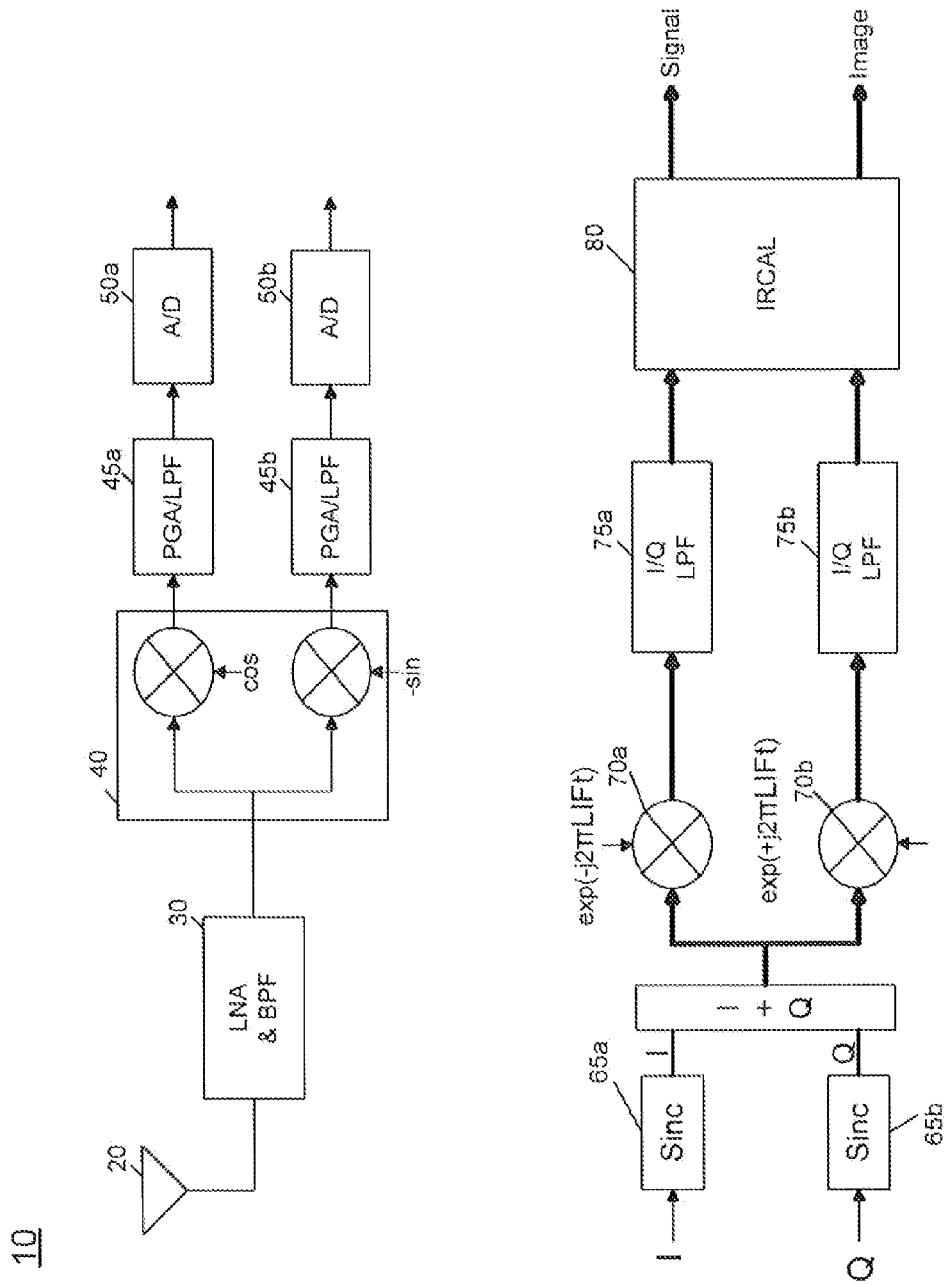
FIG. 1 is a block diagram of a receiver including an analog signal path and a digital signal path in accordance with one embodiment of the present invention.

A high level architecture of a receiver in accordance with one embodiment of the present invention is shown in FIG. 1. As shown in FIG. 1, receiver 10 includes an analog signal path and a digital signal path. In various embodiments, the digital signal path may be implemented using a digital signal processor (DSP). Furthermore, both the analog and digital portions may be implemented in a single integrated circuit, e.g., a single die CMOS circuit, although the scope of the present invention is not limited in this regard.

As seen, incoming signals, which may be RF signals received over the air or in another manner, may be received via an antenna 20 that in turn is coupled to a low noise amplifier (LNA) and a bandpass filter (BPF) 30. The filtered and amplified RF signals are then provided to a mixer 40 which may be a complex mixer to downconvert these signals. Mixer 40 may also be a source of mismatch, as the multiphase mixer can cause a parasitic 2×LO mixing signal that causes mismatch even if the I and Q signal paths are aligned. Embodiments may provide for cancellation of this further source of mismatch.

In various implementations, the incoming signals may be downconverted to an intermediate frequency (IF), e.g., a low-IF frequency such as 4 MHz, although the scope of the present invention is not limited in this regard. Thus the output from mixer 40 provides I and Q signal paths. As seen, both signal paths are provided to a programmable gain amplifier (PGA)/low pass filter (LPF) $45_a$ and $45_b$ and in turn to an analog-to-digital converter (ADC) $50_a$ and $50_b$ such as a delta-sigma converter to digitize the signals.

Referring still to FIG. 1, the digitized signals may be provided to a digital signal path that may include various components including a decimator/low pass filter (LPF) $65_a$-$65_b$ to remove the high frequency sigma-delta noise, and which may further include a high pass filter to suppress DC and low frequency (below desired channel) components. These filtered digitized signals may then be downconverted to baseband via a second complex mixer $70_1$-$70_b$. Note that in FIG. 1, the heavy lines indicate complex signals while the thinner lines indicate real signals. The image rejection calibration works by processing both the desired signal band and the image band. After conversion to low IF, the desired band is centered at 4 MHz and the image (interferer) band is centered at −4 MHz. In one embodiment the top branch of complex mixer $70_1$ and $70_b$ shifts the desired signal band down to baseband from 4 MHz and the lower branch shifts the interferer band up to DC. The mixing operation of +/−4 MHz is approximate since there is no effort to lock to the carrier frequency. As a result, the frequency conversion to baseband may be in error by some unknown ppm (note that a FLL/PLL block following image rejection calibration can remove any residual frequency error by performing another fine frequency shift/mixing operation).

The output of 65$a$ is the real (in-phase) low pass filtered low IF signal and the output of 65$b$ is the imaginary (quadrature) low pass filtered low IF signal. This pair of signals forms a complex output where the desired channel is centered at +4 MHz, while the image signal is centered at −4MHz. Complex mixer 70$a$ shifts the desired signal down in frequency to baseband. Complex mixer 70$b$ shifts the image signal up to baseband.

After conversion to baseband, signals are provided to a low pass filter $75_a$-$75_b$, which may be a 2 MHz low pass filter in some implementations. From there, these signals may be provided to an IR calibration (IRCal) circuit 80 which as described further below may perform image rejection calibration or filtering to thus remove any image information present in the desired signal band (and vice-versa). IRCal block 80 may use adaptive filters (e.g., two 3-tap complex adaptive FIR filters) to remove the residual interferer from the signal path and the residual signal from the interferer path. Accordingly, the output from the image rejection calibration circuit 80 includes a desired channel signal and an image channel signal.

FIG. 2A shows the desired signal and interferer at RF, while FIG. 2B shows the translation to LIF, and finally to baseband as two separate complex paths in FIGS. 2C and 2D. As can be seen in FIGS. 2C and 2D, the interferer is contaminating the signal path and vice versa. IRCal in accordance with an embodiment of the present invention will minimize this cross-contamination.

Note that as the IRCal operation is on baseband signals, the entire IR problem can be modeled as a baseband signal separation issue. In essence, the interferer is crosstalk into the signal path and the signal path is crosstalk into the interferer path. As used herein, path 1 is the signal path and path 2 is the interferer path. As with any crosstalk (or echo cancellation) algorithm, the interfering signal must be known in order to cancel it; therefore, the interferer is separately downconverted.

Figure 3:
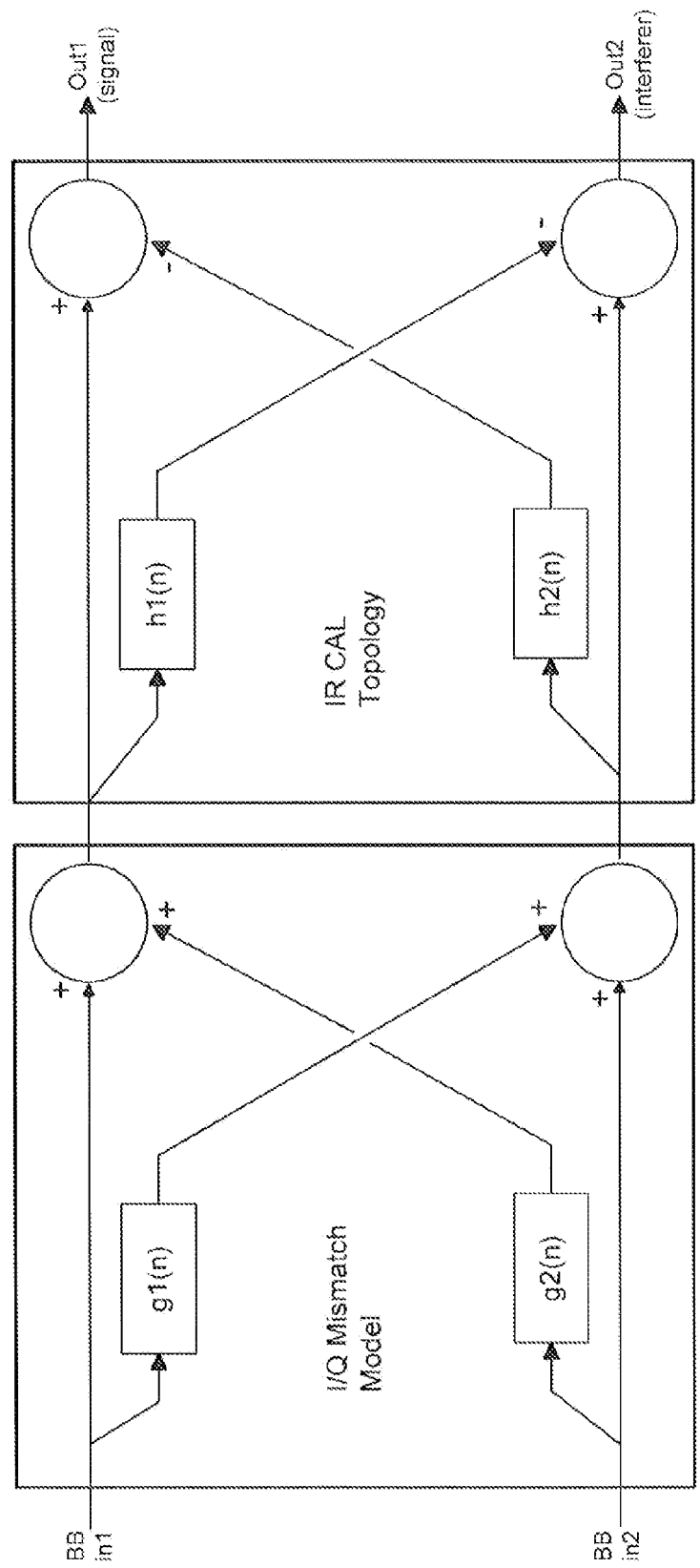
FIG. 3 is a model of an image rejection problem and solution in accordance with one embodiment of the present invention.

Referring now to FIG. 3, shown is a block diagram model of the IR problem and solution. In FIG. 3, g1($n$) and g2($n$) are the complex impulse responses that model the crosstalk between the signal and interferer paths, and h1($n$) and h2($n$) are filters, e.g., 3-tap adaptive complex FIR filters, that are used to separate the signals.

The inputs to the IRCAL block, in the frequency domain:

$$IRIN_1(z)=BBIN_1(z)+G_2(z)BBIN_2(z)$$

$$IRIN_2(z)=BBIN_2(z)+G_1(z)BBIN_1(z)$$

The outputs of the IRCAL block are:

$$IROUT_1(z)=BBIN_1(z)[1-H_2(z)G_1(z)]+BBIN_2(z)[G_2(z)-H_2(z)]$$

$$IROUT_2(z)=BBIN_2(z)[1-H_1(z)G_2(z)]+BBIN_1(z)[G_1(z)-H_1(z)]$$

At convergence, $H_1=G_1$ and $H_2=G_2$, resulting in:

$$IROUT_1(z)=BBIN_1(z)[1-H_2(z)G_1(z)]$$

$$IROUT_2(z)=BBIN_2(z)[1-H_1(z)G_2(z)]$$

Note that the degenerate solution with $$H_2 = \frac{1}{G_1} \text{ and } H_2 = \frac{1}{G_2}$$

would cause the interferer and desired signals to flip. However, this will not occur because it would require that FIR filter coefficients be on the order of $1\times10^3$ as opposed to embodiments in which the coefficients are on the order of $1\times10^{-3}$. To avoid this unlikely scenario, coefficient magnitudes of the FIR filters may be limited accordingly.

Notice that after signal separation has occurred in the IRCal block, the IR outputs will not be exactly equal to the original baseband inputs. To remove any residual magnitude or phase errors from the original baseband signal, post processing after the IRCal block may be performed. Post processing filters $$P_1(z) = \frac{1}{1 - H_2(z)G_1(z)} \text{ and } P_2(z) = \frac{1}{1 - H_1(z)G_2(z)}$$

may be employed to repair paths 1 and 2, respectively. Note that the mismatch models of the analog circuits produce images that are down by approximately 40 dB prior to IRCal correction. The adapted coefficients of $H_1$ or $H_2$ are in the range of $1\times10^3$, and thus post-processing filters may be avoided in many implementations.

Since mismatches will often occur in such a way so that $G_1(z)=G_2*(z)$, the desired channel output from IRCal can be derived as:

$$IROUT_1(z) = BBIN_1(z)[1-H_1*(z)G_1(z)] = BBIN_1(z)[1-|H|^2].$$

Figure 4:
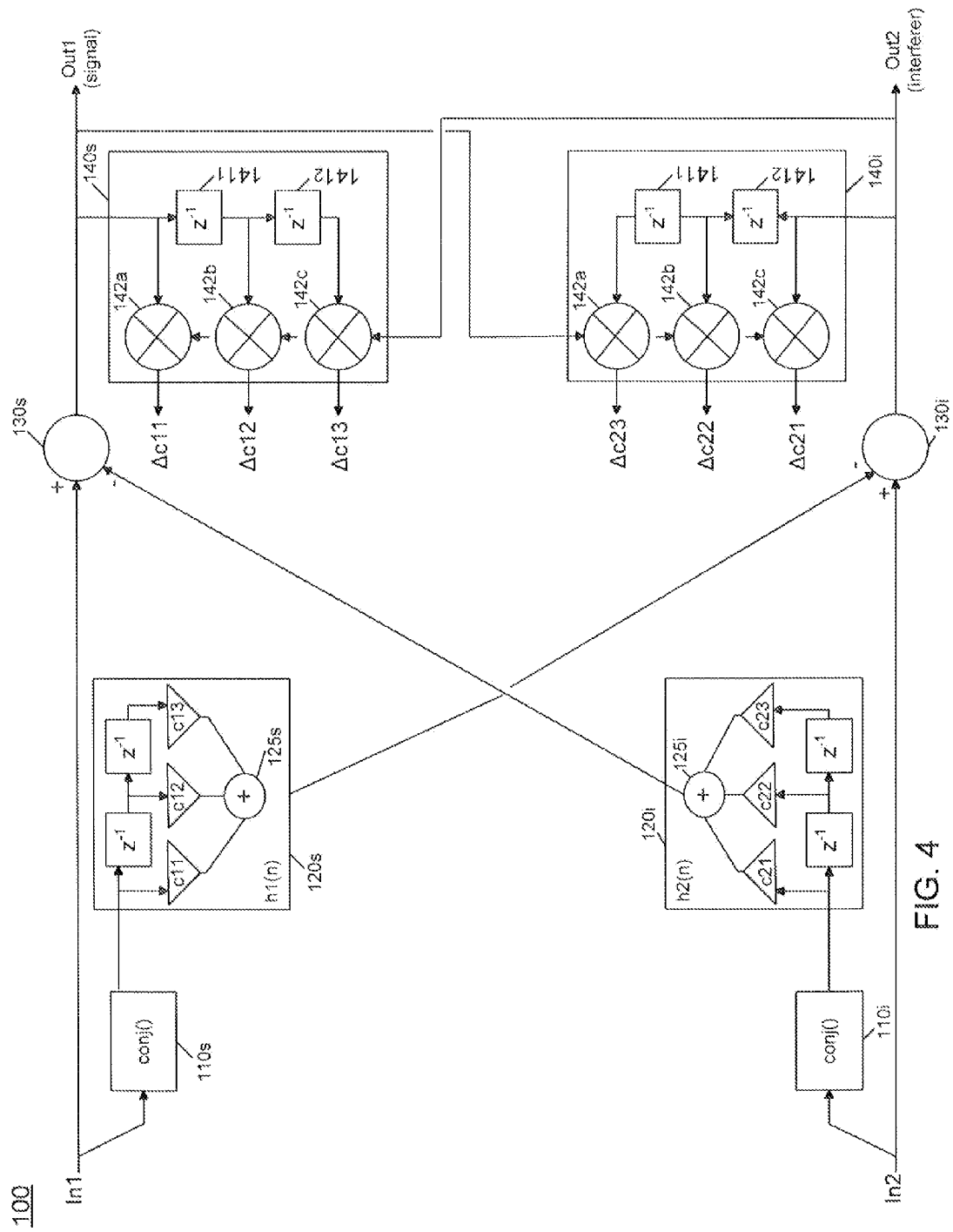
FIG. 4 is a block diagram of an image rejection calibration block in accordance with one embodiment of the present invention.

Referring now to FIG. 4, shown is a block diagram of an IR calibration block in accordance with one embodiment of the present invention. The topology of FIG. 4 maintains complete symmetry, and provides for memory cells at the output of the IRCal block to aid in least mean squared (LMS) acquisition for use in filter adaptation. In particular, use of these memory cells eliminates a steady state bias in the convergence that would otherwise occur. The FIR filters $h1(n)$ and $h2(n)$ have been shown with expanded detail for a three-tap implementation, although other implementations are possible.

As shown in FIG. 4, IR calibration circuit 100 provides for removal of interfering signal information from a signal channel path. As seen in FIG. 4, a desired signal channel path receives an incoming signal channel baseband signal 1N I that is provided to a summer $130_s$, where information regarding the image channel is removed to thus provide a signal channel output, OUT 1 that is substantially free of interfering channel information. As seen, the incoming channel signal is also provided to a conjugate function $110_s$. The complex conjugate function may act to generate a negative of the imaginary part of a complex signal, in other words a complex number $ae^{j\Theta}$ may be transformed into $ae^{-j\Theta}$. The conjugate values are then applied to a filter $120_s$ which, as described above may be a 3-tap FIR filter having two delay elements and three coefficients $C_{11}$-$C_{13}$, the outputs of which are combined in a summer $125_s$.

Note that the signal channel path further includes a correlation unit $140_s$ that includes a plurality of correlators $142_{a-c}$, each of which performs a correlation between an output of the image channel path, OUT 2, and a current or delayed sample of the signal channel output, OUT 1. More specifically, correlation unit $140_s$ includes a pair of storage elements $141_1$ and $141_2$ that store previous samples of the signal channel output. These samples (and the current sample) may be provided to the correlators, which multiply these values with the current sample of the image channel output. As will be discussed further below, these correlator or gradient outputs $\Delta C_{11}$-$\Delta C_{13}$ may be used to update the coefficients of filter $120_s$. In various embodiments, however, these correlator outputs may be gained and gear shifted to provide a smoother adaptive updating of the filter coefficients, as described further below.

Note that similar components are present in the image channel path, namely a summer $130_i$, a correlator $140_i$, a conjugate function $110_i$ and a filter $120_i$. While shown with this particular implementation in the embodiment of FIG. 4, the scope of the present invention is not limited in this regard. Furthermore, for ease of illustration circuitry to generate the gain factor and the gear factor are not shown in FIG. 4.

The following provides a theoretical basis for the architecture of FIG. 4. INPUT 1 is modeled as containing mostly signal, S(n) and a small amount of interferer, I(n); while INPUT 2 is the interferer with some signal.

$$IN1(n)=S(n)+\Sigma a_{2i}I*(n-i+1) \text{ where } i=1,2,3$$

$$IN2(n)=I(n)+\Sigma a_{1i}S*(n-i+1) \text{ where } i=1,2,3$$

The $a_{2i}$ are the coefficients of the $g2(n)$ impulse response and the $a_{1i}$ are the coefficients of the $g1(n)$ impulse response. Output 1 can then be derived as:

$$OUT1(n)=S(n)+\Sigma(a_{2i}-c_{2i})I*(n-i+1)- \Sigma\Sigma c_{2j}a_{1i}S*(n-i+1-j)$$

Since S(n) will always be much larger than $c_{2j}a_{1i}S*(n-i+1-j)$ (i.e., the coefficients are each on the order of 1e-3), OUT1(n) and OUT2(n) can be approximated by:

$$OUT1(n)=S(n)+\Sigma(a_{2i}-c_{2i})I*(n-i+1)$$

$$OUT2(n)=I(n)+\Sigma(a_{1i}-c_{1i})S*(n-i+1)$$

By driving the FIR filter coefficients $c_{ij}$ to equal the $a_{ij}$ coefficients will completely separate the signals (i.e., decorrelate the signals) and simultaneously minimize the power in OUT1 and OUT2. The update algorithm is based on this decorrelation/power minimization cost function.

In one embodiment, the desired signal at 4 MHz LIF will couple via a real transfer function $F_{diff}$ to −4 Mhz and the interferer will couple from a low IF of −4 Mhz to +4 Mhz via $F_{diff}$. Note that the magnitude response of $F_{diff}$ is an even function and the phase response is an odd function. Therefore, the interferer and desired signal will couple into the opposite frequency band with the same magnitude but opposite phase.

Frequency translation to baseband of the LIF bands (−4MHz and +4MHz) with the digital mixer does not alter the coupling mechanism, therefore the signal crosstalk and signal separation model in FIG. 3 has the property that: $G_1(j\omega)=G_2*(j\omega)$. At convergence, $H_1=G_1$ and $H_2=G_2$, therefore, $H_1(j\omega)=H_2*(j\omega)$.

At LIF, assume that the spectrums of the signal and interferer are $S(f-f_o)$ and $I(f+f_o)$, respectively. (The signal and interferer have passband spectrums centered at $f_o$ and $-f_o$, respectively). With analog front end mismatch, the combined signal spectrum at LIF is:

$$S(f-f_o)+I(f+f_o)+F_{diff}(f+f_o)S*(f+f_o)+F_{diff}(f-f_o)I*(f-f_o)$$

The output of the digital downconverter (+4 MHz to DC) is:

$$S(f-(f_o-f_{LO}))+I(f+f_o-f_{LO})+F_{diff}(f+f_o f_{LO})S*(f+f_o-f_{LO})+ F_{diff}(f-(f_o-f_{LO}))I*(f-(f_o-f_{LO}))$$

After baseband channel filtering the "signal" path includes the downconverted signal and some leakage component of the interferer:

$$S(f-(f_o-f_{LO}))+F_{diff}(f-(f_o-f_{LO}))I*(f-(f_o-f_{LO}))$$

The output of the digital upconverter (−4MHz to DC) is:

$$I(f+f_o f_{LO})+F_{diff}(f+(f_o-f_{LO}))S*(f+f_o-f_{LO})$$

The signal leakage model in FIG. 3 suggests:

$$G_1(f)=F_{diff}(f+(f_o-f_{LO})) \text{ and } G_2(f)=F_{diff}(f-(f_o-f_{LO})).$$

Thus $G_1(f)=G_2*(f)$ and at convergence: $H_1(f)=H_2*(f)$

Although $F_{diff}$ has an even magnitude response, $G_1$ and $G_2$ do not due to the up and down conversion process. Therefore, $G_1$, $G_2$, $H_1$ and $H_2$ are complex transfer functions. Since the filters of the IR calibration block are implemented with 3 tap complex FIR filters, the zeroes of these two transfer functions will be complex conjugates, and hence the filter coefficients will be complex conjugates. In one embodiment, the LMS algorithm can adapt such that the tap weights obey the following:

$$c_{1k} = c_{2k}^* \text{ for } k=1,2,3,$$

However, other implementations are possible. In another embodiment, $C_{11}$ may equal $C_{21}$ while $C_{12}$, $C_{13}$, $C_{22}$ and $C_{23}$ are calculated independently. Alternately, the coefficients for the two filters can be independent. In one particular embodiment $C_{11}$ and $C_{21}$ can be set to be equal while $C_{12}$ and $C_{22}$ and $C_{13}$ and $C_{23}$ are complex conjugates (respectively). In this implementation, only one set of filter updates may be calculated (e.g., based on the C/I ratio) and then the complex conjugates are taken for the corresponding taps of the other path's filters. Also, the choice of which filter is to have calculated updates may be based on the C/I ratio. More specifically, if the C/I ratio is much greater than one, the signal path filter $120_s$ may have its taps updated using values calculated in signal correlator $140_s$, and these values can be used to obtain updated values for image filter $120_i$. However, when the C/I ratio is much less than one, the opposite situation occurs and the calculations from image correlator $140_i$ are also used to update the signal filter $120_s$.

Correlation units 140 attached to the outputs of the IRCal circuit correlate the current sample of a given output with current and previous samples of the opposite output. The $c_{ij}$ coefficients are then adapted to minimize the correlation. For the bottom correlator function (140i):

$$\text{OUT1}(n)\text{OUT}(2n) = S(n)I(n) + I(n)\Sigma(a_{2i} - C_{2i})I^*(n-i+1) + S(n)\Sigma(a_{1i} - c_{1i})$$

$$S^*(n-i+1) + \ldots + \Sigma\Sigma(a_{2i} - c_{2i})(a_{1j}c_{1j})S^*(\ldots)I^*(\ldots)$$

Since the product $(a_{2i} - c_{2i})(a_{1j} - c_{1j})$ should be an extremely small number for practical cases and since they are multiplied by uncorrelated sequences ($S^*(\ldots) I^*(\ldots)$), OUT1($n$) OUT2($n$) can be approximated as:

$$\text{OUT1}(n)\text{OUT2}(n) = S(n)I(n) + I(n)\Sigma(a_{2i} - c_{2i})I^*(n-i+1) + S(n)\Sigma(a_{1i} - c_{1i})S^*(n-i+1)$$

or with some rearrangement:

$$\text{OUT1}(n)\text{OUT}(2n) = S(n)I(n) + (a_{21} - c_{21})|I(n)|^2 + (a_{22} - c_{22})I(n)I^*(n-1) + (a_{23}c_{23})$$

$$I(n)I^*(n-2) + \ldots (a_{11} - c_{11})|S(n)|^2 + (a_{12} - c_{12})S(n)S^*(n-1) + (a_{13} - c_{13})S^*(n)S^*(n-2) + \ldots$$

Assuming that there is no long term correlation between S(n) and I(n) as well as between different samples of I(n) and different samples of S(n), then the above equation can be simplified to:

$$\text{OUT1}(n)\text{OUT2}(n) = (a_{21} - c_{21})|I(n)|^2 + (a_{11} - c_{11})|S(n)|^2$$

Referring to FIG. 4, many correlations are taken to update all the tap coefficients. They are summarized here:

$$\text{OUT1}(n)\text{OUT2}(n) = (a_{21} - c_{21})|I(n)|^2 + (a_{11} - c_{11})|S(n)|^2 + \text{uncorrelated terms}$$

$$\text{OUT1}(n)\text{OUT2}(n-1) = (a_{22} - c_{22})|I(n-1)|^2 + \text{uncorrelated terms}$$

$$\text{OUT1}(n)\text{OUT2}(n-2) = (a_{23} - c_{23})|I(n-2)|^2 + \text{uncorrelated terms}$$

$$\text{OUT1}(n-1)\text{OUT2}(n) = (a_{12} - c_{12})|S(n-1)|^2 + \text{uncorrelated terms}$$

$$\text{OUT1}(n-2)\text{OUT2}(n) = (a_{13} - c_{13})|S(n-2)|^2 + \text{uncorrelated terms}$$

We have 5 equations and 6 unknowns. However, in one embodiment, it is known that $a_{21} = a_{11}^*$, thus $c_{21} = c_{11}^*$. Each of the correlation equations can be driven to zero over time with the following update algorithms:
For coefficients of h1($n$):

$$c_{1i}^{k+1} = c_{1i}^k + \text{gainOUT1}(n-i+1)\text{OUT2}(n)$$

Or for all 3 coefficients of h2($n$):

$$c_{2i}^{k+1} = c_{2i}^k + \text{gainOUT1}(n)\text{OUT2}(n-i+1)$$

For i=1, special attention may be required. The $c_{21}$ coefficient can be updated as shown in the next equation and then $c_{11}^k$ can can be computed as $c_{21}^k$. In many embodiments, $C_{11} = C_{21}$, $C_{12} = C^*_{22}$ and $C_{13} = C^*_{23}$.

$$c_{2i}^{k+1} = c_{21}^k + \text{gain }[\text{OUT1}(n)\text{OUT2}(n)]$$

The adaptation rate of the LMS algorithm depends on two primary functions: channel-to-interferer ratio and error convergence. As to the C/I ratio, if the relative power of the desired signal ("C") versus the interferer or image signal ("I") is significantly different, the update rate and hence gain of the LMS algorithm can be quite rapid. If the C/I ratio is close to 0 dB, the LMS gain may be kept relatively small. As to the error convergence, when the LMS algorithm is first initiated (e.g., when a user of the receiver selects a new channel), the error is large and hence a large LMS gain can be used to converge more rapidly. However, the gain is reduced as the error is driven down. Otherwise, the noise of the LMS algorithm will limit the error minimization. By examining the progress of image attenuation, the overall gain of the LMS algorithm can be gear shifted. The overall gain of the LMS algorithm can be described as follows:

$$IRCAL_{GAIN} = LMS_{GAIN} * \text{GEAR}.$$

This overall gain is then multiplied with the outputs of the correlator units of the IRCal blocks (e.g., $\Delta C_{11}$-$\Delta C_{13}$) to obtain the filter updates to be applied to the filter coefficients. In one particular implementation, a next coefficient value (e.g., for $C_{11}$) may be determined as follows:

$$\text{next\_C}_{11} = C_{11} * (1 - \text{LEAKAGE}) + LMS \text{ gain} * \text{GEAR} * \Delta\_C_{11}.$$

In addition to the above described terms, LEAKAGE is used to prevent very small DC $\Delta\_C_{11}$ values from accumulating onto $C_{11}$. In other words, this leakage value compensates for a minimal change to the $\Delta\_C_{11}$ value. In one implementation, LEAKAGE can take the value of 0 (no leakage added) or power of 2 values between $2^{-32}$ to $2^{-16}$.

The $LMS_{GAIN}$ can be determined based at least in part on the C/I ratio, and GEAR can be set based at least in part on the error convergence progress. In one embodiment for implementation simplicity, all gains can be set as powers of two, and GEAR has a minimum value of 1.0, which corresponds to the final phase of convergence.

Figure 5:
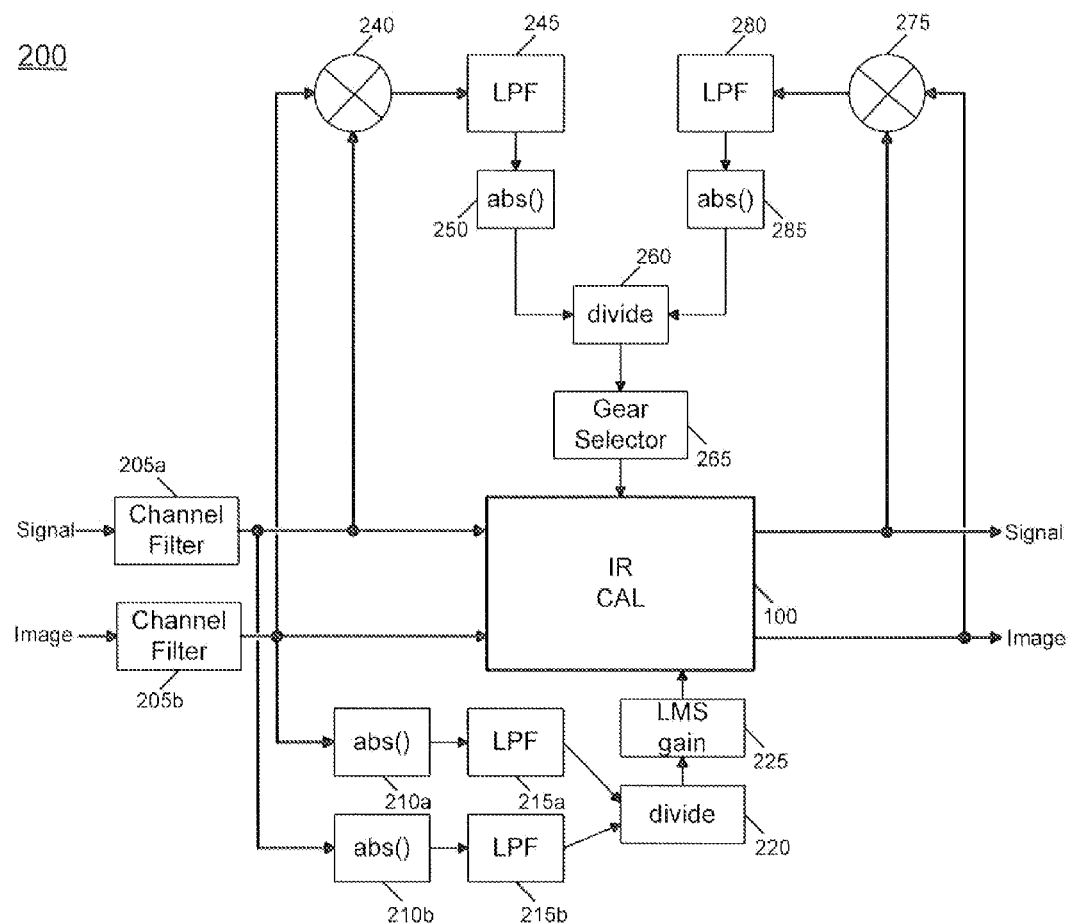
FIG. 5 is a block diagram of a circuit for gain adjustment for an image rejection calibration block in accordance with one embodiment of the present invention.

Circuitry in accordance with an embodiment of the present invention can automatically compute the C/I ratio and error convergence and set the parameters appropriately. A block diagram of a circuit for gain adjustment for an IRCal block in accordance with one embodiment of the present invention is shown in FIG. 5. As shown in FIG. 5, various circuitry may be present in addition to calibration circuit 100 to generate the gain and gear factors used in updating the coefficients of the filters within calibration circuit 100. Specifically, as seen in FIG. 5, receiver 200 is used to process incoming baseband desired channel signals and images. These different signal paths are provided through channel filters $205_a$ and $205_b$ to calibration circuit 100, which may be implemented as discussed above with regard to FIG. 4. As further seen in FIG. 5, additional circuitry may be present to generate the gear selection and gain control.

First with reference to gain control circuitry, the filtered baseband inputs to calibration circuit 100 may further be processed to obtain information regarding their signal strengths. More specifically, these signals may be provided to absolute value circuitry $210_a$ and $210_b$ to obtain an absolute value of the signals. These values may then be filtered in low pass filters $215_a$ and $215_b$. In one embodiment, the low pass filters can be implemented as a cascade of two first-order infinite impulse response (IIR) filters without multipliers. In this embodiment, at a sample rate of 24 MHz, the filter has a corner frequency of 2.3 kHz and an attenuation of approximately 80 dB at 300 kHz. Then to obtain the C/I ratio, the filtered values may be provided to a division function 220. However, as discussed further below in various embodiments computation complexity may be eased by determining a difference in most significant bits (MSBs) between the two values to obtain an approximate C/I ratio value. This value in turn is provided to a gain function 225, which generates a LMS gain value that is provided to calibration circuit 100. Different implementations of this gain function 225 may be provided. For example, a lookup or other table-based mechanism may be provided to output a particular gain value based on the input, namely the C/I ratio approximation. Of course other implementations, including a firmware-based implementation to generate a gain value based on C/I ratio is possible.

As further shown in FIG. 5, circuitry to generate a gear factor may also be provided. As seen, this circuitry first calculates a correlation between the signal and image values at the input and output of calibration circuit 100. Specifically, correlator 240 obtains a correlation of the signal and image inputs, while correlator 275 obtains a correlation of the signal and image outputs. Each of these correlation values is then filtered in LPFs 245 and 280, respectively. An absolute value of these filtered values may be obtained in absolute value functions 250 and 285, respectively. Then a ratio of these processed correlation values may be obtained in a division block 260. Similar to that discussed above with regard to the C/I ratio, this block may be implemented by determining a difference in bit positions between the MSBs of the two values. Based on this information, a gear selector 265 may determine a gear value that is used along with the gain value to update the coefficients of the filters within calibration circuit 100. While shown with this particular implementation in the embodiment of FIG. 5, the scope of the present invention is not limited in this regard.

Thus in one embodiment, the C/I ratio is computed by measuring the power in the desired baseband signal versus the power in the image signal at the input of the IRCal circuit. The error progress can be evaluated by examining the ratio of the two correlations described above, namely the signal to image correlation at the output and the input of the IRCal circuit. When the algorithm first starts, the ratio of correlations is 1.0, meaning that the IRCal circuit is yet to have any benefit and as such a large gain can be used (e.g., GEAR>>1). As the IRCal converges, the ratio approaches zero and the gear shift becomes, e.g., 1.0, and the smallest step is used. Details of the measurements for the gain and gear setting algorithms (and the algorithms themselves) are described in the following sections.

The gain factor controls the bandwidth of the LMS update loop and hence the update rate. The loop bandwidth is inversely proportional to the noise power in the gradient signal. The noise power is the sum of the terms that are long-term uncorrelated, such as S(n)I(n) in the OUT1(n) OUT2(n) gradient output.

The primary noise source for the gradient signal ($\Delta C_{21}$) for $c_{21}$ is S(n)I(n). The other noise sources due to the correlation of I(n) with I*(n−1) and with I*(n−2) and S(n) with S*(n−1) and with S*(n−2) will be ignored since long-term the coefficient adaptation will drive those noise sources to zero. The "signal-to-noise" ratio for the update process for the $c_{21}$ is of the form (not rigorous):

$$LMS\ SNR_{c21} = (a_{21} - c_{21})\frac{[I(n)I^*(n) + S(n)S^*(n)]}{S(n)I(n)} \propto \left[\frac{1}{C/I} + C/I\right]$$

The best LMS SNR occurs when the C/I ratio is extremely high or extremely low. In those cases, larger gain steps can be used. The poorest performance will occur when the C/I ratio is near unity, and thus requires a very low gain.

The LMS gain and hence LMS loop bandwidth is lowered when the "signal-to-noise" ratio for the LMS update process is low. The gain can be adjusted with respect to a nominal gain—that is determined at a nominal C/I ratio level. Expressing everything in dB, the gain equation is:

$$\text{gain} = gain_{nominal}\frac{10^{|(C/-dB)|/10}}{10^{|(C/nominal-dB)|/10}}$$

Experimentally, $gain_{nominal}=1.0$ and CI nominal−dB=60 dB

In order to adjust the LMS gain, the inband desired signal power versus the interferer's power in the same band is obtained. The "C/I" ratio is then:

$$C/I=|S|^2/|I|^2$$

Calculating the rms level of the signal and interferer requires squaring operations as well as square roots.

Instead, the rms level of the signal and interferer can be estimated by summing the absolute value of their real and imaginary parts.

$$|S|=|S_R|+|S_I||I|=|I_R|+|I_I|$$

The error introduced with this simplification results in an error factor that ranges from 0 to $\sqrt{(2)}$ (or ±1.5 dB), depending on the angle. Since the calculation for the interferer introduces a similar error, the error in the C/I ratio is within ±3 dB, which can be acceptable for setting the LMS gain in many implementations. Furthermore, calculating the C/I ratio requires a division operation in the ideal case. If the desired signal is stronger than the interferer, the first equation below is used; otherwise, the second equation below is used.

The $10^{-6}$ was found experimentally with Matlab solutions. Assuming that $G_o=1$ and using binary notation the above equations convert to:

$$\text{GAIN} = 2^{-20}2^0\left[\frac{|S|^2}{|I|^2}\right] \text{ or } \text{GAIN} = 2^{-20}2^0\left[\frac{|I|^2}{|S|^2}\right]$$

However to avoid division (and assuming that the signal and image power are expressed in binary) C/I ratio can be approximated by simply examining the relative MSB position of the signal and interferer. As seen in Table 1, it can be determined by analysis of the difference in bits between the two values.

TABLE 1

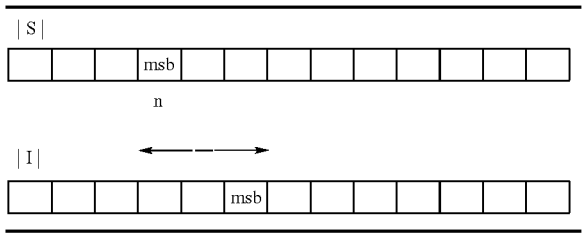

In one embodiment, the resulting LMS gain can be then approximated as:

$$\text{GAIN} = 2^{-20} 2^0 2^{2|n|}$$

where n is the difference in the MSB positions. Although the gain is not exact and will vary with time as the signal and interferer characteristics change, the average gain of the LMS algorithm will be kept approximately correct.

The gear shifting algorithm examines the convergence progress of the IRCal block by comparing the signal-to-interferer correlation (i.e., IN1 and IN2, respectively) at the input of IRCal versus the signal-to-interferer correlation (i.e., OUT1 and OUT2, respectively) at the output of the IRCal. When convergence is just beginning, a high gearshift is used and near convergence the gear shift drops to 1.0. To save hardware, the calculation of the gear shifting uses only the MSB of the relevant quantities as described above with regard to C/I ratio. The outputs of the IRCal block are multiplied (complex) and the real and imaginary parts are filtered with a cascade of two first order IIR filters. (Note that the multiplication of OUT1 and OUT2 is already available in the LMS coefficient update hardware for $C_{12}$ and $C_{21}$). In one embodiment, the filters have the same transfer function as that used in the LMS gain calculation block. After low pass filtering, the approximate magnitude of the correlation is calculated by adding the absolute value of the real and imaginary parts. The magnitude is then expressed in binary form and only the MSB is used. The MSB of the correlation at the output of IRCal is compared against the MSB of the correlation at the input of IRCal to select the gear shifting to use. As described above for the gain calculation, a look-up or firmware based implementation may also be used.

Gear shifting in accordance with one embodiment of the present invention is provided in Table 2 below:

TABLE 2

| Relative Correlation Error | Gear Shift Output | Relative Gain Setting (GEAR) |
|---|---|---|
| >1.0 | >0.0 | 256 |
| <=1.0 | <=0.0 | 128 |
| <=0.5 | <1.0 | 32 |
| <=0.25 | <=-2.0 | 8 |
| <=0.125 | <=-3.0 | 1 |

A gear shifting example is shown in FIGS. 6A and B. In the example of FIGS. 6A and 6B, the desired signal is NTSC and there are two NTSC interferers. FIG. 6A is a plot of the relative correlation error (i.e., output correlation divided by input correlation) (note to avoid initial transients the correlation error is set to 0.125 at t=0), while FIG. 6B shows the gear shifting that is being applied.

Figure 7:
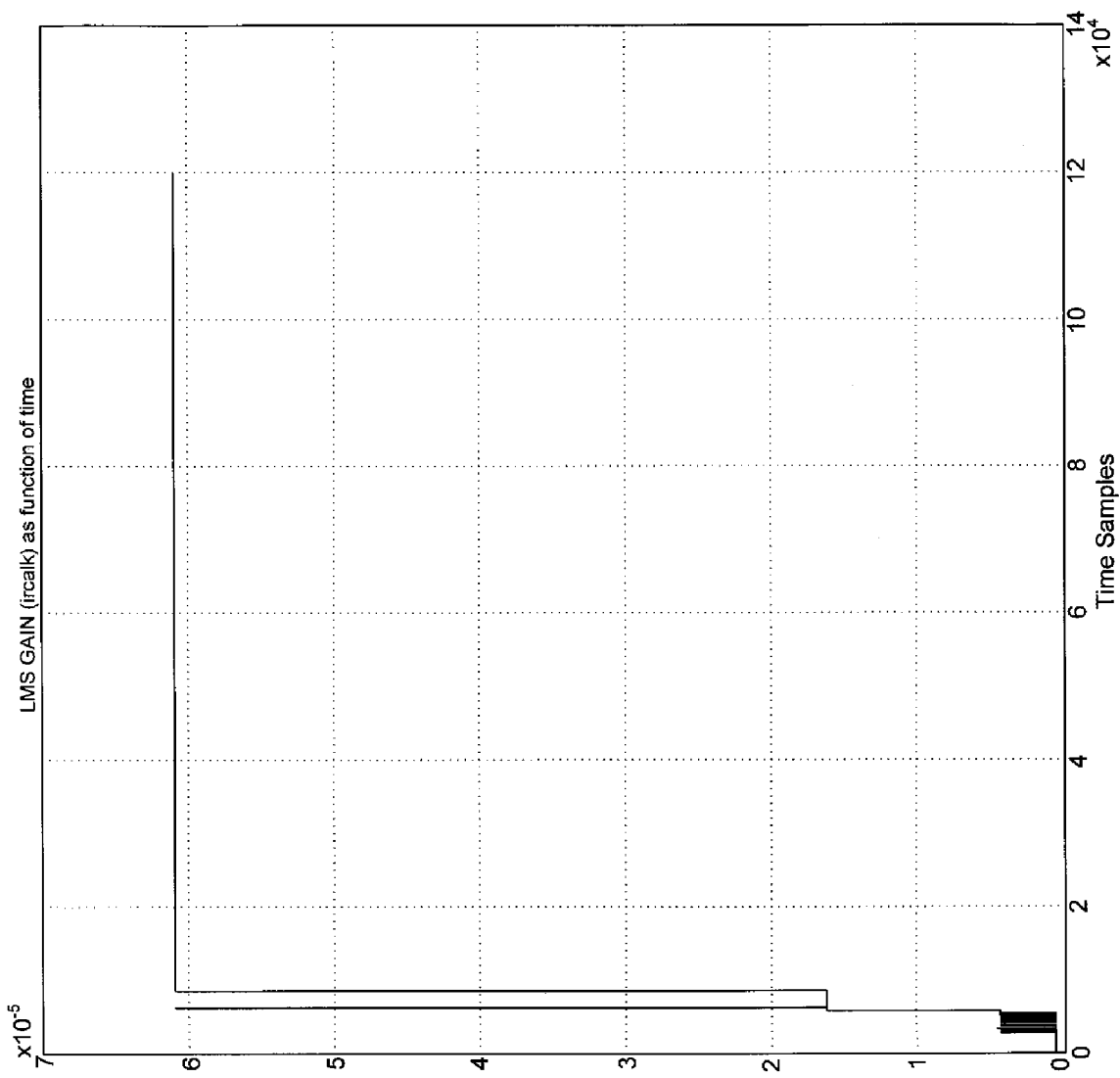
FIG. 7 is a timing diagram of a gain control signal in accordance with one embodiment of the present invention.

The LMS gain calculation based on the C/I ratio approximate calculation approach described above is shown in FIG. 7. Thus the overall gain used in the LMS algorithm is the product of the gearshift in FIG. 6B and the LMS gain value of FIG. 7. As described above, this gain is then multiplied with the AC values determined in the correlators of the IRCal block to obtain the update values to be applied to the filter coefficients.

When computing the correlation for the LMS algorithm and for gear shifting, at convergence (or in the case of infinite image rejections), the correlation computation should have no component at DC. Any component at DC will drive and bias the LMS algorithm.

Analog TV can be particularly troublesome with the three sub-carriers (video, chroma and audio). The low-IF frequency thus should be chosen so that in the correlation process, no systematic error is created with a frequency component at DC. It is preferred to move the tones as far away from DC (by properly choosing the low IF frequency) so the filtering in the gearshift calculation, C/I ratio-based LMS gain filtering, and in the core IRCal LMS adaptation itself will have reduced ripple due to low frequency correlation tones. In one embodiment, the tones may be kept more than 300 kHz away from DC.

Figure 8:
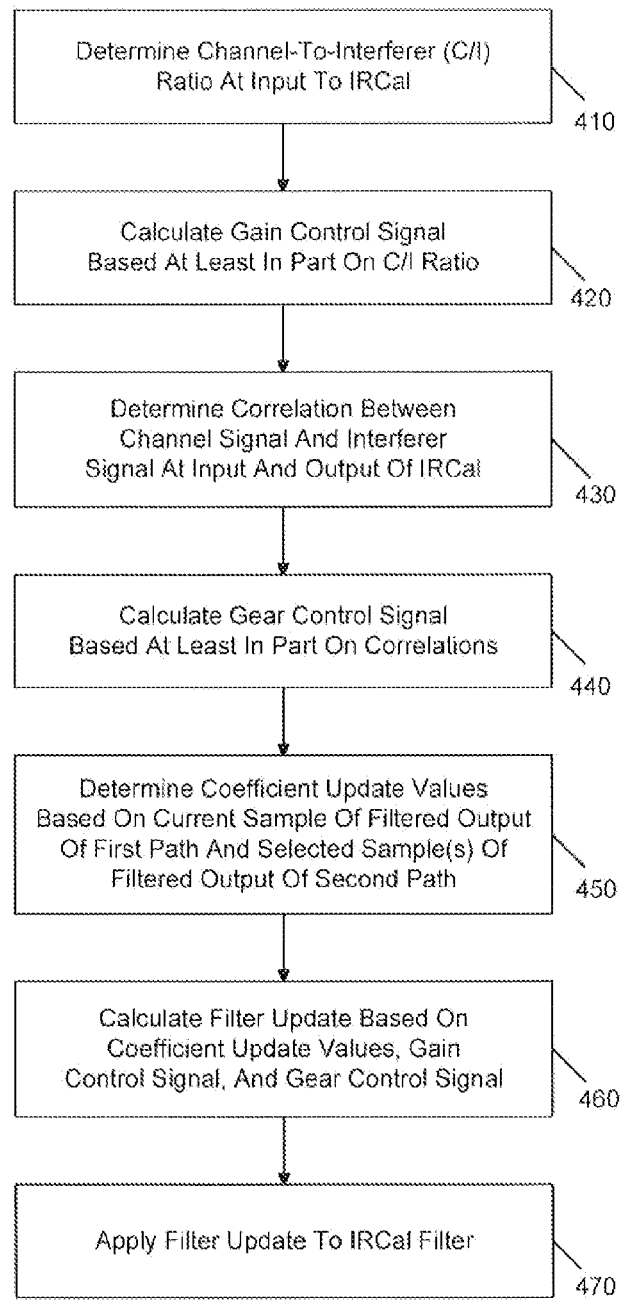
FIG. 8 is a flow diagram of a method in accordance with one embodiment of the present invention.

Referring now to FIG. 8, shown is a flow diagram of a method in accordance with one embodiment of the present invention. As shown in FIG. 8, method 400 may be used to update filter coefficients of the filter of a given path (either signal or image) of the IRCal block. As seen in FIG. 8, method 400 may begin by determining the C/I ratio at the input to the IRCal block (block 410). As discussed above an approximation of this ratio instead may be determined. From this ratio, a gain control signal may be calculated (block 420).

As further seen in FIG. 8, correlations may be determined between the channel and interferer signals at both the inputs and outputs of the IRCal block (block 430). Based on a ratio of these two correlations, a gear control signal may be determined (block 440). Thus, based on the amount of correlation between the inputs and outputs (where the correlation decreases as convergence nears), a different gear control signal can be generated.

Still further, during the actual IR calibration performed in the IRCal block, coefficient update values may be determined based on a current sample of a filtered output of a first path and selected samples (one or more) of the filtered output of the opposite path (block 450). These coefficient update values (or gradient values, e.g., Δc of FIG. 4) may then be used, along with the gain and gear control signals to calculate a filter update (block 460). In one embodiment, the gain and gear control signals may be multiplied along with the coefficient update values, where a separate such value is provided for each coefficient of the filter. Then, a filter update may be applied to the IRCal filter (block 470). That is, the filter update may be added to the coefficient value (or subtracted in the case of a negative filter update value). Note similar steps may be performed to update the filter of the other path. While shown with this particular implementation in the embodiment of FIG. 8, the scope of the present invention is not limited in this regard. For example, is it possible to use different gear, LMS gain and leakage values for each coefficient. It is also possible to update only one coefficient at a time (or a subset of coefficients); also correlations need not be taken at every sample.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a signal channel path including a first mixer to receive an intermediate frequency (IF) signal and to downconvert the IF signal to a signal channel baseband signal;
an image channel path including a second mixer to receive the IF signal and to downconvert the IF signal to an image channel baseband signal;
an image rejection calibration unit to receive the signal channel baseband signal and the image channel baseband signal and including:
a signal filter to receive a value of the signal channel baseband signal and to generate a filtered signal channel value;
a first combiner to combine the signal channel baseband signal with a filtered image channel value to obtain a signal channel path output;
an image filter to receive a value of the image channel baseband signal and to generate the filtered image channel value;
a second combiner to combine the image channel baseband signal with the filtered signal channel value to obtain an image channel path output; and
a signal correlator to correlate a current sample of the image channel path output with a current sample and at least one previous sample of the signal channel path output.

2. The apparatus of claim 1, further comprising a first circuit to determine a first correlation of the signal channel baseband signal and the image channel baseband signal and a second correlation of the signal channel path output and the image channel path output and to generate a gear control signal based at least in part on the first and second correlations.

3. The apparatus of claim 2, further comprising a second circuit to determine a signal strength of the signal channel baseband signal and the image channel baseband signal and to generate a gain control signal based at least in part on the signal strengths.

4. The apparatus of claim 3, wherein the signal correlator includes storages to store a plurality of samples of the signal channel path output and a plurality of multipliers to determine a product of one of the plurality of signal channel path output samples and the current sample of the image channel path output.

5. The apparatus of claim 4, wherein the image rejection calibration unit is to update the signal filter based on the signal correlator output, the gain control signal, and the gear control signal.

6. The apparatus of claim 5, wherein the image rejection calibration unit is to further update the signal filter based on a leakage value to compensate for a minimal change to the signal correlator output.

7. The apparatus of claim 2, further comprising an image correlator to correlate a current sample of the signal channel path output with a current sample and at least one previous sample of the image channel path output.

8. The apparatus of claim 7, wherein the image rejection calibration unit is to update the image filter based on an output of the image correlator, the gain control signal and the gear control signal.

9. The apparatus of claim 3, wherein the second circuit is to determine a difference in bit positions of a most significant bit (MSB) of the signal channel baseband signal strength and the image channel baseband signal strength.

10. The apparatus of claim 9, wherein the second circuit is to estimate a ratio between the signal channel baseband signal strength and the image channel baseband signal strength based on the bit position difference.

11. The apparatus of claim 10, wherein the second circuit is to generate the gain control signal with a first value during convergence and a second value after convergence, the first value greater than the second value.

12. The apparatus of claim 1, wherein a first coefficient of the image filter corresponds to a first coefficient of the signal filter, and at least one other coefficient of the image filter is a complex conjugate of a corresponding coefficient of the signal filter.

13. The apparatus of claim 1, wherein the apparatus comprises a digital circuit to receive the IF signal as a digital complex signal and to provide the signal channel path output to a digital signal processor to perform demodulation of the signal channel path output to output video information.

14. A system comprising:
an antenna to receive a radio frequency (RF) signal;
an analog front end to receive the RF signal from the antenna and to downconvert the RF signal to an intermediate frequency (IF) signal and to convert the IF signal to a digital complex signal;
a digital signal processor (DSP) coupled to the analog front end, the DSP including an image canceller to perform image rejection, the image canceller including:
a signal filter to receive a signal channel value and to generate a filtered signal channel value;
an image filter to receive an image channel value and to generate a filtered image channel value;
a first combiner to combine the signal channel value and the filtered image channel value to obtain a signal channel output;
a second combiner to combine the image channel value and the filtered signal channel value to obtain an image channel output;
a signal correlator to correlate a current sample of the image channel output with a current sample and at least one previous sample of the signal channel output, wherein the signal filter is to be updated based at least in part on an output of the signal correlator; and
an image correlator to correlate a current sample of the signal channel output with a current sample and at least one previous sample of the image channel output, wherein the image filter is to be updated based at least in part on an output of the image correlator.

15. The system of claim 14, wherein the signal correlator includes a plurality of registers each to store a sample of the signal channel output and a plurality of multipliers to determine a product of one of the signal channel output samples and the current sample of the image channel output.

16. The system of claim 14, further comprising a first circuit to determine a signal strength of the signal channel value and the image channel value and to generate a first control signal based at least in part on the signal strengths, wherein the first circuit is to generate the first control signal with a first value during convergence and a second value after convergence, the first value greater than the second value.

17. The system of claim 16, wherein the image filter is to be updated with a set of update values obtained from the signal correlator if a ratio of the signal strengths of the signal channel value and the image channel value is greater than a first threshold and the signal filter is to be updated with a set of update values obtained from the image correlator if the ratio is less than a second threshold.

18. The system of claim 16, further comprising a second circuit to determine a first correlation of the signal channel value and the image channel value and a second correlation of the signal channel output and the image channel output and to generate a second control signal based at least in part on the first and second correlations.

19. The system of claim 18, wherein the image canceller is to update a plurality of coefficient elements of the signal filter based on an update value determined based on a correlation of a first sample of the image channel output and a plurality of samples of the signal channel output, the first control signal, and the second control signal.

20. The system of claim 14, wherein the image filter includes a plurality of coefficients that are complex conjugates of corresponding coefficients of the signal filter.

21. The system of claim 14, wherein the signal filter comprises a multi-tap filter including a plurality of delay elements each having an output to be multiplied with a coefficient value of a corresponding coefficient element, wherein each said coefficient element is updatable using the signal correlator output.

22. A method comprising:
    determining a channel-to-image (C/I) ratio between a channel signal and an image signal at an input to an image rejection unit, and generating a gain control value based at least in part on the C/I ratio;
    determining a first correlation between the channel signal and the image signal at the image rejection unit input and a second correlation between the channel signal and the image signal at an output of the image rejection unit, and
    generating a gear control value based at least in part on a ratio between the first and second correlations; and
    updating a first filter of the image rejection unit using the gain control value and the gear control value.

23. The method of claim 22, further comprising determining the C/I ratio based on a difference in bit positions of a most significant bit (MSB) of the signal channel signal strength and the image channel signal strength, the difference corresponding to an estimate of the C/I ratio.

24. The method of claim 22, further comprising correlating a current sample of the image signal at the image rejection unit output with a current sample and at least one previous sample of the channel signal at the image rejection unit output to obtain gradient values.

25. The method of claim 24, further comprising updating the first filter based on the gradient values, the gain control value, and the gear control value.

26. The method of claim 25, further comprising removing a portion of the image signal present in the channel signal at the image rejection unit input using the first filter, and removing a portion of the channel signal present in the image signal at the image rejection unit input using a second filter.

27. The method of claim 22, further comprising, based on the C/I ratio, updating a set of coefficients of the first filter and causing at least a portion of a second set of coefficients of a second filter of the image rejection unit to be conjugates of corresponding ones of the updated set of coefficients.

* * * * *